United States Patent Office 3,162,628
Patented Dec. 22, 1964

3,162,628
METAL COMPLEX MONOAZO TRIAZINE DYESTUFFS
Alistair Howard Berrie and Cyril Morris, Manchester, England, assignors to Imperial Chemical Industries Limited, London, England, a corporation of Great Britain
No Drawing. Filed Dec. 2, 1960, Ser. No. 73,226
Claims priority, application Great Britain, Dec. 21, 1959, 43,327/59
4 Claims. (Cl. 260—146)

This invention relates to new metal complex monoazo dyestuffs. More particularly, it relates to new water-soluble chromium and cobalt complex compounds of monoazo dyestuffs of the triazine series.

According to the invention there are provided the chromium and cobalt complexes of the monoazo compounds which contain from 2 to 6 strongly acid solubilising groups and which, in the form of the free acids, are represented by the formula:

(1)

wherein A stands for an aryl radical carrying the carboxylic acid group in ortho position to the azo group, E stands for a mono- or dicyclic aryl radical carrying a hydroxyl or amino group in ortho position to the azo group, and X stands for a group of the formula:

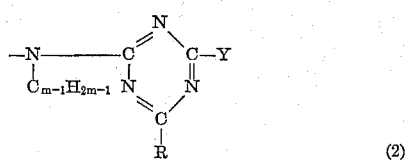

(2)

wherein $m$ stands for an integer,

Y stands for a chlorine or a bromine atom, and

R stands for a chlorine or a bromine atom or an amino or substituted amino group.

In the above formula, A may represent a dicyclic aryl radical such as naphthalene or substituted naphthalene radical but preferably A represents a monocyclic aryl radical such as an unsubstituted benzene radical or a benzene radical carrying substituents such as chlorine, bromine, sulphonic acid, nitro, acetylamino, methanesulphonyl, carboxy, methoxy, benzoyl, trifluoromethyl, sulphamyl and N:N-dimethylsulphamyl.

The symbol E in the above formula may represent for example the radical of an o-coupling phenol, a 2-naphthol, a 1-naphthylamine, a 2-naphthylamine, a m-aminophenol or a m-phenylene diamine, but preferably E represents the radical of a 1-naphthol coupling component especially a 7-anilino-1-naphthol coupling component.

The symbol $m$ in the above formula preferably represents an integer of from 1 to 5, particularly 1, so that the group $C_{m-1}H_{2m-1}$ represents either an alkyl group of 1 to 4 carbon atoms or, preferably, a hydrogen atom.

As examples of substituted amino groups represented by R in the above formula, there may be mentioned mono- or dialkylamino (including substituted alkyl- or cycloalkyl-amino), such as methylamino, ethylamino, β-hydroxyethylamino, cyclo-hexylamino, dimethylamino, diethylamino and di(β-hydroxyethyl)amino, nitrogen-containing saturated heterocyclic radicals such as piperidino, morpholino and pyrrolidino and mono arylamino particularly monocyclic arylamino such as anilino, o-, m- or p-sulphoanilino, o-, m- or carboxyanilino, N-methylanilino and N-ethylanilino.

According to a further feature of the invention there is provided a process for manufacture of the new metal-complex monoazo dyestuffs which comprises treating a monoazo compound which, in the form of the free acid, is represented by the formula:

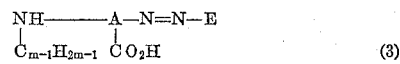

(3)

wherein A, $m$ and E have the meanings stated above with a halogenotriazine of the formula:

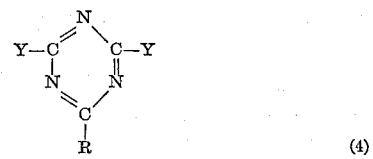

(4)

wherein Y and R have the meanings stated above, A, E and R having a total of from 1 to 5 strongly acid solubilising groups, and with an agent yielding chromium or cobalt.

In the process of the invention, there may be used from about 1 to 2 molecular proportions of the monoazo compound of Formula 3 for each molecular proportion of agent yielding metal, and about 1 molecular proportion of the halogenotriazine for each group of the formula —NHC$_{m-1}$H$_{2m-1}$ present in the monoazo compound.

The process of the invention may be carried out by treating the monoazo compound with the halogenotriazine and subsequently treating with the agent yielding chromium or cobalt, but it is preferred to treat the monoazo compound with the agent yielding chromium or cobalt and subsequently to treat the chromium or cobalt complex so obtained with the halogenotriazine.

The treatment of the monoazo compound with the agent yielding chromium or cobalt may be carried out by any of the methods known for obtaining chromium or cobalt complexes of azo compounds, for example by heating an aqueous solution of the monoazo compound with an aqueous solution of the agent yielding chromium or cobalt, adding salt and filtering off the chromium or cobalt complex which is precipitated.

The treatment of the chromium or cobalt complex with the halogenotriazine may be conveniently carried out by stirring an aqueous solution of the chromium or cobalt complex with an aqueous suspension or solution of the halogenotriazine, preferably at a temperature between 0° and 50° C., whilst adding sodium carbonate to maintain the pH of the mixture at 7, adding salt and filtering off the metallised azo dyestuff which is precipitated.

As examples of halogeno-s-triazines which may be used there may be mentioned cyanuric chloride, cyanuric bromide, 2-amino-4:6-dichloro-s-triazine and like 2-m-sulphoanilino-4:6-dichloro-s-triazine, the primary condensation products of cyanuric bromide or, preferably cyanuric chloride, with an amino compound such as methyl, dimethyl, ethyl, diethyl, propyl, isopropyl, butyl, hexyl or cyclohexylamine, piperidine, morpholine, β-chloroethylamine, methoxyethylamine, γ-methoxypropylamine, ethanolamines, propanolamines and acylated amines such as acetamide, butyric acid amide, urea, thiourea, hydrazine, thiosemicarbazide and toluene sulphonic acid amides, also glycocol, amino-carbonic acid esters such as the methyl or ethyl ester, amino acetic acid ethyl ester, aminoacetamide and especially 1-aminobenzene-2:5-disulphonic acid, 1-aminobenzene-2-, -3- or -4-sulphonic acid, 1-aminobenzene-2-, -3- or 4-carboxylic acid, β-aminoethane sulphonic acid and N-methylaminoethane sulphonic acid.

As examples of the agents yielding chromium or cobalt which may be used to obtain the new metal-complex monoazo dyestuffs there may be mentioned chromium acetate, chromium formate, cobalt acetate, cobalt chloride, cobalt sulphate, chromium chloride, chromium sulphate, chromium fluoride, chromium sesquioxide (which may be used as its hydrated form) and mixtures of chromium salt with alkali metal or ammonium salts of hydroxy carboxylic acids, for examples tartaric acid and salicylic acid.

The monoazo compounds which are used in the process of the invention may be obtained by diazotising an o-carboxy arylamine which contains an acylamino (conveniently an acetylamino) group or a nitro group, coupling the diazo compound so obtained with a coupling component of the formula H—E wherein E has the meaning stated above and subsequently, by hydrolysis or reduction and (if necessary) alkylation, converting the acylamino or nitro group to a group of the formula —NHC$_{m-1}$H$_{2m-1}$.

As examples of o-carboxyarylamines which may be used to obtain these monoazo compounds there may be mentioned 3-, 4- or 5-nitroanthranilic acid, 4- or 5-acetylaminoanthranilic acid, 2-nitro-5-aminoterephthalic acid and 4-benzoylaminoanthranilic acid.

A wide variety of coupling components may be used to manufacture the nitro- or acylamino group containing monoazo compounds.

Thus, there may be used o-coupling phenols, or p-coupling phenols which contain a second hydroxyl or an amino group in meta-position to the hydroxyl group and N-alkyl and N-aryl derivatives of these, m-phenylenediamines, naphthols, aminonaphthols and N-alkyl, N-aryl and N-acyl derivatives of these, and o-coupling naphthylamines of N-alkyl derivatives of these.

As examples of phenols there may be mentioned p-cresol, 3 - amino-4-methylphenol, resorcinol, m-aminophenol, 3-hydroxy-N-methylaniline, 3-hydroxydiphenylamine, 3:4-dimethylphenol and 3-acetylamino-4-methylphenol. As examples of m-phenylenediamines there may be mentioned m-phenylene diamine itself, 4-methyl-1:3-phenylenediamine and 4-sulpho-1:3-phenylenediamine.

As examples of naphthols there may be mentioned 2-naphthol and naphtholsulphonic acids such as 1-naphthol-4- and 5-sulphonic acids, 2-naphthol-6-, 7- and 8-sulphonic acids, 1-naphthol-3:6- and 3:8-disulphonic acids 2-naphthol-3:6- and 6:8-disulphonic acids, 1-naphthol-3:6:8-trisulphonic acid and 1:8-dihydroxynaphthalene-3:6-disulphonic acid; aminonaphthols containing a free coupling position ortho to the hydroxyl group such as 1-amino-8-naphthol-3:6- and 4:6-disulphonic acids, 2-amino-5-naphthol-7-sulphonic acid, 2-amino-5-naphthol-1:7-disulphonic acid, 2-amino - 8 - naphthol-6-sulphonic acid, 1-amino-5-naphthol-7-sulphonic acid, 2-amino-8-naphthol-3:6-disulphonic acid, 1-amino - 8 - naphthol-4-sulphonic acid, 1-amino-8-naphthol-2:4-disulphonic acid, N-alkyl derivatives of these preferably those containing 1 to 4 carbon atoms in the alkyl group, such as 1-methylamino-8-naphthol-3:6-disulphonic acid, 1-n-butylamino-8-naphthol-3:6-disulphonic acid, 2-ethylamino - 5 - naphthol-7-sulphonic acid and 2-n-butylamino-8-naphthol-6-sulphonic acid, 2-dimethylamino-8-naphthol-6-sulphonic acid, arylamino and aminoarylaminonaphthol sulphonic acids such as 1-phenylamino-8-naphthol-3:6-disulphonic acid, 2-phenylamino-8-naphthol-4':6-disulphonic acid, 2-(4-aminophenylamino) - 5 - naphthol-3':7-disulphonic acid and 2-phenylamino-5-naphthol-7-sulphonic acid; acylamino- and aminoacylamino-naphthol sulphonic acids such as 1-acetylamino-8-naphthol-3:6-disulphonic acid, 2-acetylamino-8-naphthol-6-sulphonic acid, 1-(3'-aminobenzoylamino) - 8 - naphthol-3:6-disulphonic acid, 2-(4'-aminobenzoylamino)-5-naphthol-7-sulphonic acid, 2-acetylamino-5-naphthol-7-sulphonic acid and 1-benzoylamino-8-naphthol-3:6-disulphonic acid.

As examples of naphthylamines there may be mentioned 1-naphthylamine-3:6-disulphonic acid, 2-naphthylamine-3:6-disulphonic acid, 1-naphthylamine-4-sulphonic acid and N-methyl-2-naphthylamine-7-sulphonic acid.

The conversion of the nitro- or acylamino-group containing compound to the corresponding amino compound may be carried out by the usual methods, for example where the monoazo compound contains a nitro group it may be treated in aqueous solution with sodium sulphide, and where the monoazo compound contains an acylamino group it may be treated with aqueous alkali or aqueous acid.

If desired, the new metal-complex monoazo dyestuffs containing only a single chlorine or bromine atom attached to the triazine ring may be obtained by taking one of the new metal-complex monoazo dyestuffs containing two chlorine or two bromine atoms attached to the triazine ring, and replacing one of these atoms by reaction with 1 molecular proportion of ammonia or a primary or secondary amine. This modified process forms a further feature of the invention.

The new metal-complex monoazo dyestuffs are valuable for colouring cellulose textile materials, for example textile materials comprising natural or regenerated cotton. For colouring such textile materials, the new metallised azo dyestuffs are preferably applied in an aqueous medium, either by a dyeing or printing process, to the cellulose textile materials in the presence of a hardenable aminoplast-forming substance and an acid catalyst, the material then being baked, or in conjunction with a treatment with an acid-binding agent, for example sodium hydroxide, sodium carbonate or sodium bicarbonate, which may be applied to the cellulose textile material before, during or after the application of the dyestuffs. When so applied to cellulose textile materials the new metallised azo dyestuffs react with the resin or cellulose and yield a wide range of shades according to the choice of coupling components, possessing excellent fastness to light, to washing, to acids and to alkalis.

The new azo dyestuffs can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface active cationic agents such as quaternary ammonium salts for example cetyl trimethylammonium bromide and cetyl pyridinium bromide and organic liquids such as n-butanol and benzyl alcohol.

A preferred class of the new metal-complex monoazo dyestuffs are the cobalt, or preferably, the chromium complexes of the monoazo dyestuffs of the formula:

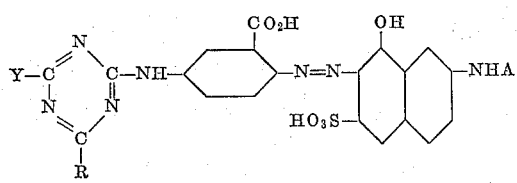

wherein Y and R have the meanings stated above and A stands for a di- or preferably mono-cyclic aryl nucleus especially where A stands for a sulphonated or carboxylated phenyl radical and the unmetallised dye contains from 3 to 4 carboxylic or sulphonic acid groups.

These dyestuffs have good reactivity and build up well to give dark brown shades having excellent fastness to light, to washing and to treatments with acids and alkalis. Despite their excellent fastness in these respects, they are surprisingly readily dischargeable.

The invention is illustrated but not limited by the following examples in which parts are by weight:

Example 1

A mixture of 15.6 parts of the trisodium salt of 2-(4'-sulphophenylamino) - 7 - (2" - carboxy - 4" - aminophenylazo)-8-naphthol-6-sulphonic acid (obtained by coupling 5-acetylamino-2-aminobenzoic acid with 2-(4'-sulphophenylamino)-8-naphthol-6-sulphonic acid followed by alkaline hydrolysis of the acetyl group), 4.6 parts of chromium triacetate and 250 parts of water is stirred at the boil under a reflux condenser for 16 hours. The solution so obtained is cooled to 50° C. made alkaline with sodium carbonate and filtered. The filtrates are then made acid by the addition of 10% aqueous hydrochloric acid, then 50 parts of sodium chloride are added and the precipitated 1:2-chromium complex of 2-(4'-sulphophenylamino) - 7 - (2"-carboxy-4"-aminophenylazo)-8-naphthol-6-sulphonic acid is filtered off and washed with brine.

A solution of the chromium complex in 165 parts of water is reacted with sodium carbonate until the pH of the solution is 7 and the solution so obtained is added with stirring to a suspension of 4.7 parts of cyanuric chloride in a mixture of 30 parts of water and 100 parts of ice, the temperature of the mixture being maintained between 0° C. and 5° C. by external cooling, and the pH of the mixture being maintained between 5.5 and 6.5 by the addition of a 5% aqueous solution of sodium carbonate. The mixture is then stirred for 30 minutes and 75 parts sodium chloride added. The dyestuff which separates is filtered off and the filter cake so obtained is mixed with 1.87 parts of sodium diethylmetanilate and 0.13 part of sodium hydrogen sulphate and the paste is dried at 20° C.

On analysis, the dyestuff composition so obtained is found to contain 3.95 atoms of organically bound chlorine per molecule of 1:2-chromium complex.

When applied to cellulose textile materials in conjunction with a treatment with an acid-binding agent, the dyestuff builds up well to give intense dark brown shades which possess excellent fastness to light, to washing and to acids and alkalis, and which are readily dischargeable.

The following table describes the shades of further dyestuffs of the invention obtained by condensing the metal-complex aminoazo compound named in the second column with 1 molecular proportion of cyanuric chloride for each amino group present in the compound, following the procedure described in Example 1:

| Example | Metal-complex aminoazo compound | Shade |
|---|---|---|
| 2 | The 1:2-chromium complex of 2-(3'-sulphophenylamino)-7-(4"-amino-2"-carboxyphenylazo)-8-naphthol-6-sulphonic acid. | Dark brown. |
| 3 | The 1:2-chromium of complex of 1-(4'-amino-2'-carboxyphenylazo)-2-naphthol-3:6-disulphonic acid. | Maroon. |
| 4 | The 1:2-chromium complex of 7-(4'-amino-2'-carboxyphenylazo)-1-phenylamino-8-naphthol-3:6-disulphonic acid. | Dark green. |
| 5 | The 1:2-chromium complex of 7-(4'-amino-2'-carboxyphenylazo)-2-phenylamino-8-naphthol-6-sulphonic acid. | Dark brown. |
| 6 | The 1:2-chromium complex of 2-(6'-sulpho-8'-hydroxy-2'-naphthylamino)-7-(4"-amino-2"-carboxyphenylazo)-8-naphthol-6-sulphonic acid. | Grey-brown. |
| 7 | The 1:2-chromium complex of 2-amino-6-(5'-amino-2'-carboxyphenylazo)-5-naphthol-7-sulphonic acid. | Reddish-violet |
| 8 | The 1:2-chromium complex of 2-amino-6-(4'-amino-2'-carboxyphenylazo)-5-naphthol-7-sulphonic acid. | Do. |
| 9 | The 1:2-chromium complex of 2-(3'-sulpho-4'-aminophenylamino)-7-(4"-amino-2"-carboxyphenylazo)-8-naphthol-6-sulphonic acid. | Purple-brown. |
| 10 | The 1:2-cobalt complex of 7-(4'-amino-2'-carboxyphenylazo)-1-phenylamino-8-naphthol-3:6-disulphonic acid. | Grey. |
| 11 | The 1:2-cobalt complex of 6-(4'-amino-2'-carboxyphenylazo)-2-phenylamino-5-naphthol-7-sulphonic acid. | Violet. |
| 12 | The 1:2-cobalt complex of 1-(4'-amino-2'-carboxyphenylazo)-2-naphthol-6-sulphonic acid. | Yellowish-brown. |
| 13 | The 1:2-cobalt complex of 2-(3'-sulphophenylamino)-(4"-amino-2"-carboxyphenylazo)-8-naphthol-6-sulphonic acid. | Greenish-blown. |

Example 14

The 1:2-chromium complex of 2-(4'-sulphophenylamino) - 7 - (2" - carboxy - 4" - aminophenylazo) - 8-naphthol-6-sulphonic acid is prepared and condensed with cyanuric chloride by the method described in Example 1. To the solution of the dichlorotriazinyl dyestuff thus obtained, there is added a solution of the sodium salt of 4.6 parts of metanilic acid in 15 parts of water. The mixture is then heated to 30 to 35° C. and maintained at this temperature for 30 minutes maintaining the pH at 7 throughout by the addition of a 5% aqueous solution of sodium carbonate. 70 parts of sodium chloride are then added and the dyestuff which separates out is filtered off and dried.

On analysis, the dyestuff composition so obtained is found to contain 1.9 atoms of organically bound chlorine per molecule of 1:2-chromium complex.

When applied to cellulose textile materials in conjunction with a treatment with an acid-binding agent, the dyestuff builds up well to give intense dark brown shades possessing excellent fastness to light, to washing and to acids and alkalis. In addition the shades are dischargeable.

The following table describes the shades of further dyestuffs of the invention obtained by condensing one molecular proportion of the metal-complex aminoazo compound named in column 2 and one molecular proportion of ammonia or the amine named in column 3 with cyanuric chloride, following the procedure described in Example 14.

| Example | Metal-complex aminoazo compound | Amine | Shade |
|---|---|---|---|
| 15 | The 1:2-chromium complex of 2-(3'-sulphophenylamino)-7-(4''-amino-2''-carboxyphenylazo)-8-napthol-6-sulphonic acid. | Metanilic acid. | Dark brown. |
| 16 | ____do____ | Ammonia | Do. |
| 17 | The 1:2-chromium complex of 2-phenylamino-7-(4'-amino-2'-carboxy-phenylazo)-8-naphthol-6-sulphonic acid. | Metanilic Acid. | Do. |
| 18 | The 1:2-chromium complex of 2-phenylamino-7-(4'-amino-2'-carboxyphenylazo)-8-naphthol-3:6-disulphonic acid. | Sulphanilic acid. | Dark green. |
| 19 | The 1:2-chromium complex of 5:6:7:8-tetrahydro-1-(4'-amino-2'-carboxyphenylazo)-2-naphthol-3-sulphonic acid. | ____do____ | Reddish-brown. |
| 20 | The 1:2-chromium complex of 1-(4'-amino-2'-carboxyphenylazo)-2-naphthol-3:6-disulphonic acid. | Methylamino. | Purple. |
| 21 | The 1:2-chromium complex of 2-(4'-amino-2'-carboxyphenylazo)-1-naphthol-4-sulphonic acid. | Ammonia | Brownish-purple. |
| 22 | The 1:2-cobalt complex of 2-(4'-amino-2'-carboxyphenylazo)-1-naphthol-4-sulphonic acid. | Aniline | Dark brown. |
| 23 | The 1:1-chromium complex of 1-(4'-amino-2'-carboxyphenylazo)-2-naphthol-3:6-disulphonic acid. | Metanilic acid. | Rubine. |
| 24 | The 1:2-cobalt complex of 2-(4'-sulphophenylamino)-7-(4''-amino-2''-carboxyphenylazo)-8-naphthol-6-sulphonic acid. | ____do____ | Yellowish brown. |

*Example 25*

A solution of 8.4 parts of aniline-3:5-disulphonic acid in 50 parts of water is neutralised by the addition of sodium carbonate and added to a suspension of 6.1 parts of cyanuric chloride in 30 parts of water and 100 parts of ice. The mixture is stirred at 0° C. and kept at a pH of 7 by the addition of aqueous sodium carbonate solution until all the amine has condensed.

The solution so obtained is added to a solution of 10.1 parts of the 1:2-chromium complex of 4-amino-2'-hydroxy-2-carboxy-5'-methylazobenzene, and stirred at 20° C. the pH being maintained at 7 by the addition of aqueous sodium carbonate solution until reaction is complete.

The dyestuff so obtained is isolated by salting and drying as described in the previous examples. It dyes cellulose in brown shades.

What we claim is:

1. A metal complex compound selected from the class consisting of 1:2-chromium and 1:2-cobalt complexes of monoazo compounds of the formula:

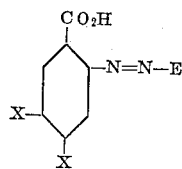

wherein
E is the radical of a coupling component having a hydroxyl group in ortho position to the azo group and selected from the class consisting of aminonaphthol disulphonic acids and 7-sulfoanilino-1-naphthol-3-sulphonic acids;
one X is hydrogen, and the other X is a group of the formula:

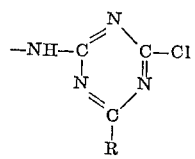

in which R stands for a member of the group consisting of chlorine, amino, and sulfophenylamino.

2. The 1:2-chromium complex of the compound of the formula

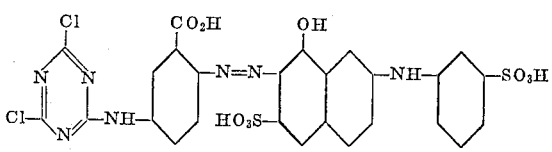

3. The 1:2-chromium complex of the compound of the formula:

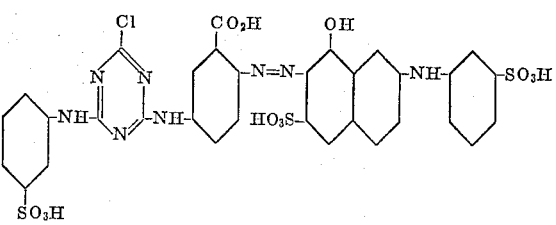

4. The 1:2-chromium complex of the compound of the formula:

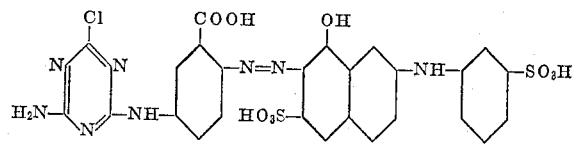

References Cited by the Examiner
UNITED STATES PATENTS

| 2,873,269 | 2/59 | Fasciati et al. | 260—153 |
| 2,929,809 | 3/60 | Menzi et al. | 260—146 |
| 2,931,794 | 4/60 | Ruetimeyer et al. | 260—146 |
| 2,943,084 | 6/60 | Buehler et al. | 260—146 XR |

FOREIGN PATENTS

| 570,122 | 2/59 | Belgium. |
| 572,967 | 5/59 | Belgium. |

CHARLES B. PARKER, *Primary Examiner.*

LEON ZITVER, IRVING MARCUS, *Examiners.*